United States Patent
Drummond et al.

(10) Patent No.: US 6,974,207 B2
(45) Date of Patent: Dec. 13, 2005

(54) LASER WELDING METHODS AND STRUCTURES AND CONTROL THEREFOR INCLUDING WELDED INKJET PRINTHEADS

(75) Inventors: James Paul Drummond, Georgetown, KY (US); Kin-Ming Kwan, Lexington, KY (US); Ganesh Vinayak Phatak, Lexington, KY (US); Jon Brock Whitney, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 210 days.

(21) Appl. No.: 10/299,792

(22) Filed: Nov. 19, 2002

(65) Prior Publication Data

US 2004/0095444 A1    May 20, 2004

(51) Int. Cl.$^7$ ............................. B41J 2/14; B41J 2/175
(52) U.S. Cl. ........................................... 347/49; 347/87
(58) Field of Search ............................. 347/85–87, 49, 347/43, 108; 219/121.64, 121.66, 121.63, 219/121.6; 428/594; 29/890.1, 593, 832, 29/840; 156/272.8

(56) References Cited

U.S. PATENT DOCUMENTS

| | | |
|---|---|---|
| 4,636,609 A | 1/1987 | Nakamata |
| 4,691,092 A | 9/1987 | Verburgh |
| 4,745,257 A | 5/1988 | Rito et al. |
| 4,782,209 A | 11/1988 | Caers et al. |
| 4,914,269 A | 4/1990 | Kinsman et al. |
| 4,960,973 A | 10/1990 | Fouche et al. |
| 4,990,741 A | 2/1991 | Moores et al. |
| 5,049,720 A | 9/1991 | Fang et al. |
| 5,183,992 A | 2/1993 | Bilge et al. |
| 5,276,303 A | 1/1994 | Bergmann |
| 5,585,827 A | 12/1996 | Murakami |
| 5,603,853 A * | 2/1997 | Mombo-Caristan .... 219/121.64 |
| 5,808,641 A | 9/1998 | Miyagawa et al. |
| 5,814,784 A | 9/1998 | Kinsman et al. |
| 5,893,959 A | 4/1999 | Muellich |
| 5,950,309 A | 9/1999 | Bryce et al. |
| 6,072,148 A | 6/2000 | Azdasht |
| 6,161,927 A * | 12/2000 | Long et al. .................... 347/86 |
| 6,193,833 B1 | 2/2001 | Gizowski et al. |
| 6,210,507 B1 | 4/2001 | Hansen et al. |
| 6,260,961 B1 | 7/2001 | Seu et al. |
| 6,273,985 B1 | 8/2001 | DeLouise et al. |
| 6,331,055 B1 | 12/2001 | Miller et al. |
| 6,339,207 B1 | 1/2002 | Bishop |
| 6,396,025 B1 | 5/2002 | Pyritz et al. |
| 6,886,928 B2 * | 5/2005 | Sasaki et al. .................. 347/86 |

(Continued)

FOREIGN PATENT DOCUMENTS

EP              159169 A2 *   10/1985      ........... B29C 65/16

Primary Examiner—K. Feggins
(74) Attorney, Agent, or Firm—Michael T. Sanderson (57) ABSTRACT

In a system for laser welding work pieces along a collapsing weld interface, methods and apparatus include providing welding pads and/or stop projections on either or both of the work pieces to control the manner or amount of collapse. Preferably, the stop projections exist a separation distance from the weld interface while the welding pads exist at and form a portion of the weld interface. Buffers are taught between the weld interface and stop projection. The work pieces may comprise inkjet printhead lids and bodies. In another aspect, the invention teaches methods of laser welding inkjet printhead lids and bodies according to whether the inkjet printhead body embodies a mono or color ink body type and especially includes selective control of one or more laser light sources to illuminate the inkjet printhead lid in a specific pattern of light.

20 Claims, 11 Drawing Sheets

U.S. PATENT DOCUMENTS

| | | |
|---|---|---|
| 2001/0013509 A1 | 8/2001 | Haschke |
| 2001/0025690 A1 | 10/2001 | DeLouise et al. |
| 2002/0000427 A1 | 1/2002 | Akhavain et al. |
| 2002/0014476 A1 | 2/2002 | Tsukamoto et al. |
| 2002/0022139 A1 | 2/2002 | Kotera et al. |
| 2002/0030723 A1 | 3/2002 | Sumi et al. |
| 2002/0041308 A1 | 4/2002 | Cleland et al. |
| 2002/0053559 A1 | 5/2002 | Nikitin et al. |
| 2002/0056707 A1 * | 5/2002 | Pinho et al. ........... 219/121.64 |
| 2002/0062563 A1 | 5/2002 | Koide et al. |
| 2002/0142184 A1 * | 10/2002 | Mazumder et al. ......... 428/594 |

* cited by examiner

LASER WELDING METHODS AND STRUCTURES AND CONTROL THEREFOR INCLUDING WELDED INKJET PRINTHEADS

FIELD OF THE INVENTION

The present invention relates to laser welding first and second work pieces. In one aspect, it relates to stop projections and welding pads on either or both of the first and second work pieces for controlling a manner and amount of collapse in a laser weld joint. In another aspect, it relates to controlling a manner of welding according to a structure type of the first or second work piece. The work pieces may specifically embody inkjet printhead lids and bodies used in inkjet printing.

BACKGROUND OF THE INVENTION

The art of laser welding is relatively well known. In general, with reference to FIG. 1, first and second work pieces, embodied as an upper work piece 100 laid on a lower work piece 120 along a weld interface 180, become welded to one another by way of an irradiated beam 140 of laser light. As is known, the beam 140 passes through the upper work piece, which is laser light absorbent, where it gets absorbed by the lower work piece, which is opaque to laser light. As the beam irradiates, the weld interface heats up and causes the bottom surface of the upper work piece and the upper surface of the lower work piece to melt and meld together. Upon cooling, a weld joint remains. An optical path between a laser light source (not shown) and the to-be-welded work pieces may include a lens 160, for proper focusing, or other optical elements, such as mirrors, fiber optic strands, scanning structures or other. A clamping device (not shown) typically provides a pressing engagement of the work pieces to maintain relative positioning and good surface contact during welding. Those skilled in the art also know that the beam may weld as an advancing beam of light (embodied as either the beam of light moving relative to stationary work pieces, work pieces moving relative to a stationary beam or both moving relative to one another) during contour welding or as a simultaneous weld (embodied as an entirety of a weld interface being welded at the same time by a light beam with substantially no movement of the work pieces or beam).

Figure 1:
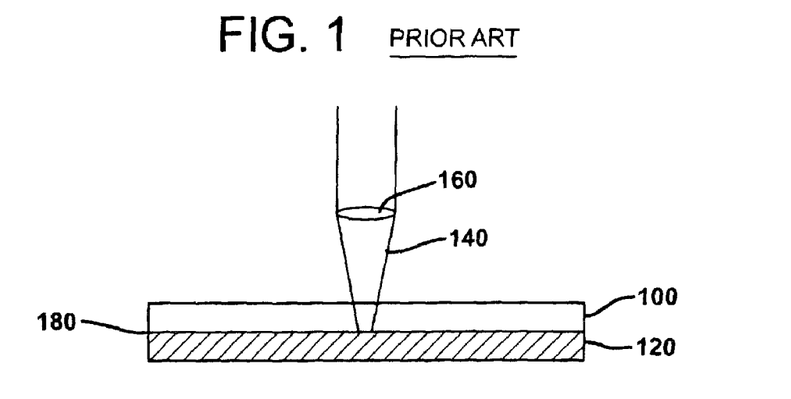
FIG. 1 is a diagrammatic view in accordance with the prior art of two substantially uniformly shaped and flat work pieces being laser welded together.

As is apparent in FIG. 1, the two work pieces 100, 120 comprise generally uniformly shaped and flat structures with a relatively lengthy weld interface. Thus, under heat and pressure during welding, the weld joint along the weld interface 180 does not suffer any appreciable collapse.

Figure 2A:
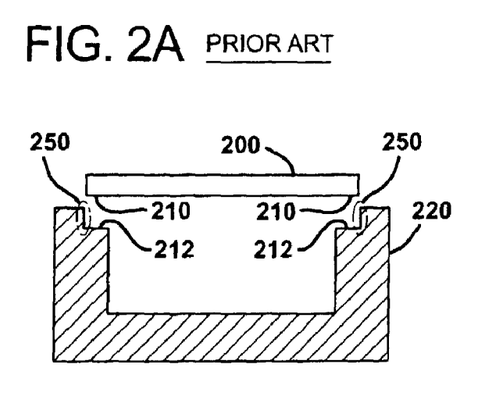
FIG. 2A is a diagrammatic view in accordance with the prior art of two non-uniformly shaped work pieces requiring laser welding.
Figure 2B:
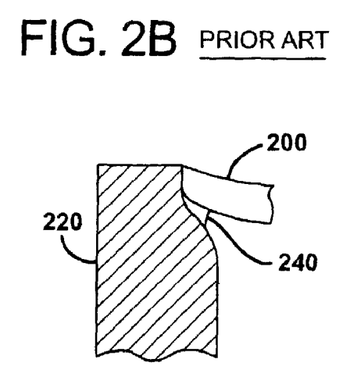
FIG. 2B is a diagrammatic view in accordance with the prior art of a weld joint after the work pieces of FIG. 2A have undergone laser welding.

With reference to FIGS. 2A and 2B, however, sometimes the work pieces do not embody uniformly shaped and flat structures as representatively shown with a to-be-welded lid 200 and container 220, nor do they always have a lengthy weld interface between the to-be-welded surfaces 210, 212. In such instances, when heat and pressure become applied during welding, the weld joint 240 adversely suffers from bowing effects or other. Moreover, sometimes the work pieces additionally contain a corner region 250 that prevents sufficient heating of the weld interface which further exacerbates the bowing condition. Often times bowing leads to undesirable manifestations, such as stress cracks.

Accordingly, a need exists in the laser welding arts for efficaciously laser welding two work pieces despite the work pieces embodying non-uniformly shaped or flat structures and/or having relatively small or short weld interfaces.

Regarding the technology of inkjet printing, it too is relatively well known. In general, an image is produced by emitting ink drops from an inkjet printhead at precise moments such that they impact a print medium, such as a sheet of paper, at a desired location. The printhead is supported by a movable print carriage within a device, such as an inkjet printer, and is caused to reciprocate relative to an advancing print medium and emit ink drops at such times pursuant to commands of a microprocessor or other controller. The timing of the ink drop emissions corresponds to a pattern of pixels of the image being printed. Other than printers, familiar devices incorporating inkjet technology include fax machines, all-in-ones, photo printers, and graphics plotters, to name a few.

A conventional thermal inkjet printhead includes access to a local or remote supply of color or mono ink, a heater chip, a nozzle or orifice plate attached to the heater chip, and an input/output connector, such as a tape automated bond (TAB) circuit, for electrically connecting the heater chip to the printer during use. The heater chip, in turn, typically includes a plurality of thin film resistors or heaters fabricated by deposition, masking and etching techniques on a substrate such as silicon.

To print or emit a single drop of ink, an individual heater is uniquely addressed with a small amount of current to rapidly heat a small volume of ink. This causes the ink to vaporize in a local ink chamber (between the heater and nozzle plate) and be ejected through and projected by the nozzle plate towards the print medium.

During manufacturing of the printheads, a printhead body gets stuffed with a back pressure device, such as a foam insert, and saturated with mono or color ink. A lid adheres or welds to the body via ultrasonic vibration. Ultrasonic welding, however, has often cracked the heater chip, introduced and entrained air bubbles in the ink and compromised overall printhead integrity. Adhering has an impractically long cure time.

Even further, as demands for higher resolution and increased printing speed continue, heater chips are often engineered with more complex and denser heater configurations which raises printhead costs. Thus, as printheads evolve, a need exists to control overall costs, despite increasing heater chip costs, and to reliably and consistently manufacture a printhead without causing cracking of the ever valuable heater chip.

SUMMARY OF THE INVENTION

The above-mentioned and other problems become solved by applying the principles and teachings associated with the hereinafter described laser welding methods and structures and control therefor.

In a system for laser welding work pieces along a collapsing weld interface, the invention teaches methods and apparatus including providing welding pads and/or stop projections on either or both of the work pieces to control the manner or amount of the collapse. The welding pads and the clearance beside them prevent the prior art problem of bowed weld joints. The stop projections impede or stop collapse from occurring beyond a desired distance during welding.

In a preferred embodiment, the stop projections exist a separation distance from the weld interface while the welding pads exist at and form a portion of the weld interface. Varieties of buffers are also taught between the weld interface and stop projection to prevent the stop projections from acquiring too much heat. In still another embodiment, the work pieces comprise inkjet printhead lids and bodies with the welding pads and/or stop projections existing on either or both.

Since mono ink and color ink inkjet printhead bodies require welds at different locations and since a manufacturer would suffer inconvenience if required to retool a laser welding apparatus when switching manufacturing from mono to color bodies, the invention further discloses methods of selectively controlling laser light according to whether the inkjet printhead body embodies a mono or color ink type. Preferably, laser light and laser power intensity becomes selectively controlled to illuminate specific patterns of light according to the actual inkjet printhead body type requiring welding. The invention even contemplates control for one or more laser light sources.

Still further, the invention discloses inkjet printers that contain the laser welded printheads.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION OF THE PREFERRED EMBODIMENT

In the following detailed description of the preferred embodiments, reference is made to the accompanying drawings that form a part hereof, and in which is shown by way of illustration, specific embodiments in which the inventions may be practiced. These embodiments are described in sufficient detail to enable those skilled in the art to practice the invention, and it is to be understood that other embodiments may be utilized and that process or other changes may be made without departing from the scope of the present invention. The following detailed description is, therefore, not to be taken in a limiting sense, and the scope of the present invention is defined only by the appended claims and their equivalents.

In accordance with the present invention, we hereinafter describe welding pads and stop projections on either or both of first and second work pieces for controlling a manner and amount of collapse in a laser weld joint despite the work pieces embodying non-uniformly shaped or flat structures and/or having relatively small or short weld interfaces. In other aspects, we describe controlling a manner of welding according to a structure type of the first or second work piece and, in all embodiments, the work pieces may specifically embody inkjet printhead lids and bodies used in inkjet printing.

Figure 3A:
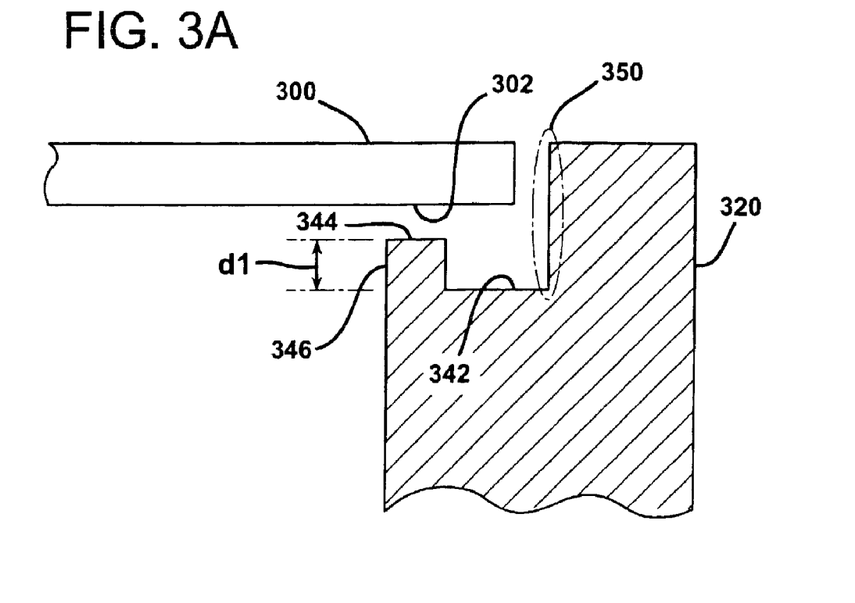
FIG. 3A is a diagrammatic view in accordance with the teachings of the present invention of a to-be-welded welding pad.
Figure 3B:
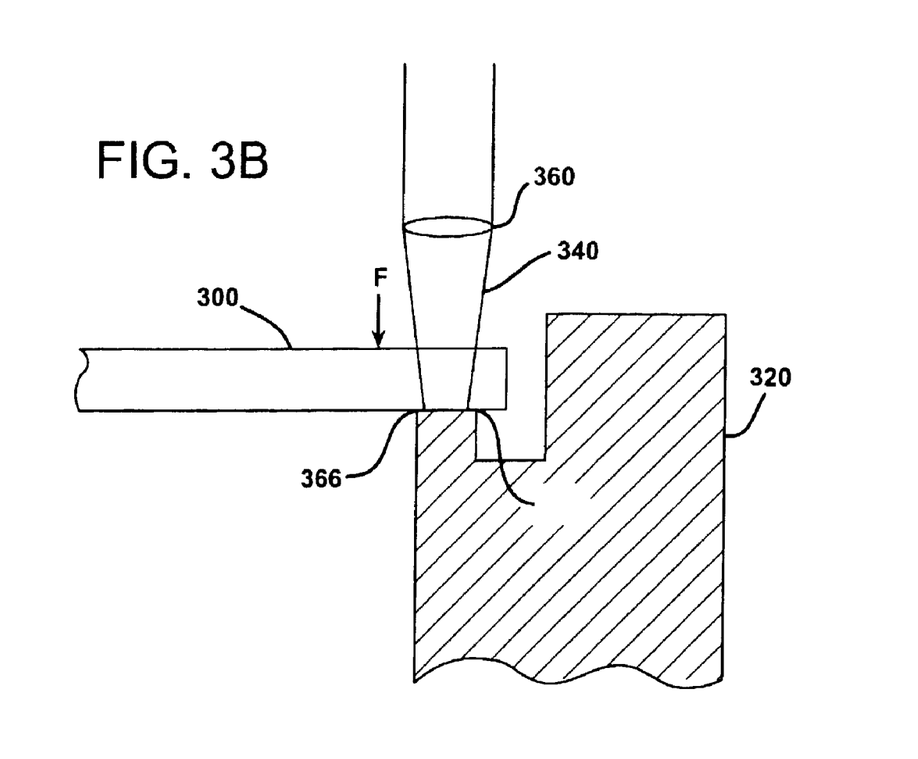
FIG. 3B is a diagrammatic view in accordance with the teachings of the present invention of the to-be-welded welding pad of FIG. 3A during a laser welding operation.
Figure 3C:
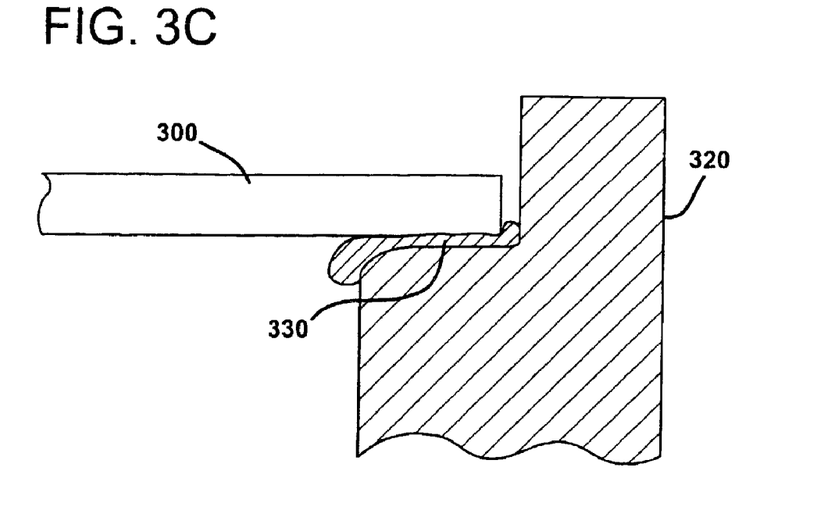
FIG. 3C is a diagrammatic view in accordance with the teachings of the present invention of a weld joint that remains after laser welding the welding pad of FIG. 3B.

With reference to FIGS. 3A–3C, the invention teaches a welding pad 346 on one of the to-be-welded first and second work pieces 300, 320 that substantially prevents bowing of a weld joint 330 because of a relatively small or short weld interface despite the presence of a corner region 350 and a relatively small or short weld interface. As shown, the welding pad 346 extends a distance d1 from a planar surface 342 of the second work piece 320 and a top 344 of the welding pad and an undersurface 302 of the first work piece, when contacted with one another (FIG. 3B), form a weld interface between positions 366 and 364. During welding, heat and pressure cause the weld interface to collapse but not so much as to have a bowed weld joint as in the prior art.

More specifically, a beam of laser light 340 transits the first work piece 300, which is transparent to laser light, to weld the first and second work pieces together at the weld interface. Since the second work piece is laser light absorbent, as the beam 340 passes through the first work piece it gets absorbed by the lower work piece and heats the weld interface. Eventually the materials of the first and second work piece, including the material of the welding pad, melt and meld together. Pressure, indicated by force line F from a clamping or pressing device (not shown), forces the welding pad to collapse. Upon cooling, a weld joint 330 (FIG. 3C) exists that improves the bowing of the prior art. Although not shown, other forces likely oppose force line F from underneath and normal to a bottom surface of the second work piece as the bottom surface rests on a platform, for example, during welding.

Regarding the optical system of the laser welding structure, a lens 360 focuses the beam 340 to the welding pad during welding but those skilled in the art should appreciate that we greatly simplified the optical path and an actual optical path may exclude the lens, replace the lens or additionally include other optical structures such as mirrors, fiber optic strands, laser scanning devices (e.g., rotating multi-faceted mirrors), other lenses or other. Preferably, the laser beam originates from a laser source such as a laser diode or a solid state laser.

Still further, those skilled in the art should appreciate the welding pad of the present invention provides an extra source of weldable material at the weld interface which contributes to resisting the collapsing force thereby controlling the collapse from becoming a bowed weld joint. As such, when the dimensions and material properties of the work pieces are fixed and the laser welding structure has fixed parameters, such as wavelength, time on, power, force, etc., the amount of collapse is generally dictated by the dimensions of the welding pad 346. Thus, the invention contemplates variously sized welding pad dimensions.

In one specific embodiment (FIG. 3D), presented merely as representative and not restrictive, the welding pad 346 has height d2 of about 0.4 mm and width of about 0.8 mm. Its length dimension, into or away from the paper, is generally dictated by the length dimension of the second work piece, into or away from the paper, and preferably shares such length. It also preferably shares the composition of the second work piece and in one embodiment comprises a plastic having a polyphenolynether plus polystyrene blend.

Regarding further compositions, the first work piece 300 (inkjet printhead lid) is preferably substantially entirely transparent and may comprise a polyphenylene ether plus polystyrene (PPE/PS) blend such as that found in Noryl TN grades resin. Compositions of the second work piece 320 (inkjet printhead body), on the other hand, include, but are not limited to, general purpose polystyrene, high impact polystyrene, such as styrene-butadiene copolymers (SBC), styrene-acrylic copolymers (SMMA). Still others include polyesters and polyester blends including polyethylene terephthalate (PET), polybutylene terephthalate (PBT), as well as blends of these plus polycarbonate (PC), acrylonitrile styrene acrylic (ASA) or other resins or other. When the second work piece is of a PET composition, preferred first work piece component compositions include the foregoing and/or may additionally include copolyesters, glycol modified PET (PETG), glycol modified polycyclohexylenemethylene terephthalate (PCTG), and acid modified PCT (PCTA) or other. Suitable welds have also been found when the first work piece 300 comprises materials having low loading levels of glass fiber such as natural PET (15% glass fiber) or blends of polyester types. Still other compositions include PC/PCTG, PC/PBT, PC/PET, PBT/PETG, PET/PBT, although these sometimes require laser power adjustment when welding to polyester inkjet printhead bodies. In still other embodiments, PBT/ASA was found to join to materials such as styrene methyl methacrylate (SMMA), and styrene acrylonitrile (SAN). One PET/PBT blend surprisingly formed good bonds with SMMA, clear ABS, ABS and methacrylate ABS (MABS). The materials discussed above are summarized in Appendix 1 (body materials correspond to the second work piece 320 while the lid materials refers to the first work piece 300). Bear in mind, compatibility with inks can also be considered when selecting suitable compositions when welding inkjet printhead lids to inkjet printhead bodies.

The welding pad may become formed on the work piece through any variety of processing steps. Preferably, it gets formed integrally on the work piece during formation of the work piece. In the instance when the work piece constitutes a plastic, the welding pad and work piece can become formed as a result of any of the well known injection molding processes.

Figure 3D:
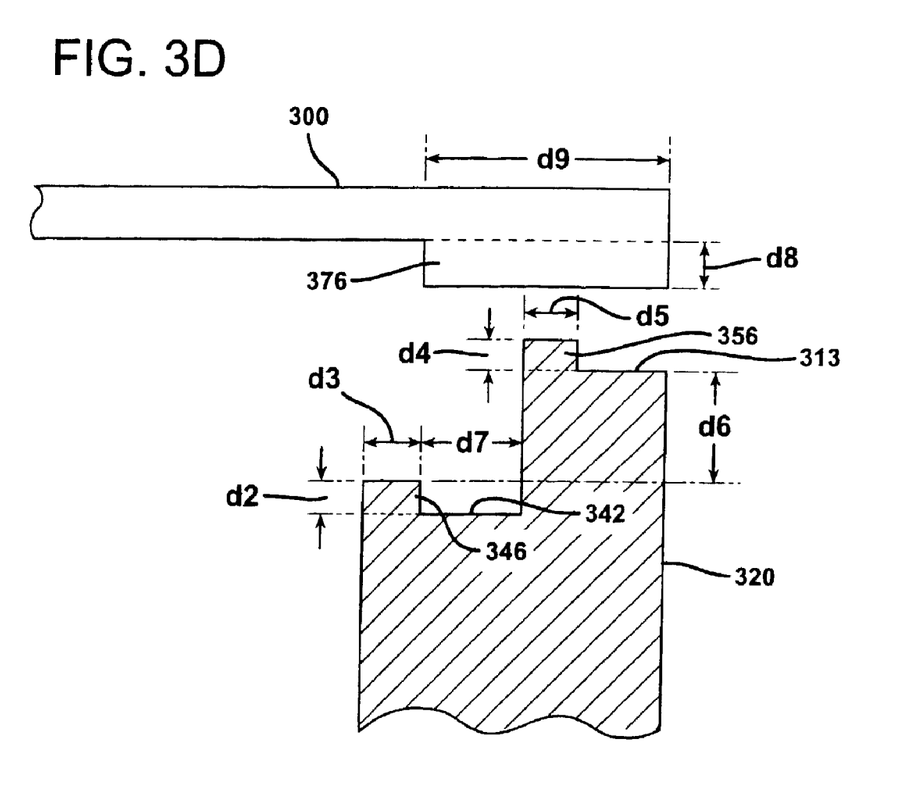
FIG. 3D is a diagrammatic view in accordance with the teachings of the present invention of a plurality of to-be-welded welding pads.

As further seen in FIG. 3D, those skilled in the art should appreciate that more than one welding pad can exist on a work piece at one time. In this embodiment, a second welding pad 356 exists a vertically spaced distance d6 above the welding pad 346 and has height d4 and width d5 dimensions of about 0.4 mm and 0.8 mm respectively. A horizontal distance d7 exists between the two welding pads in an amount of about 0.7 mm.

Even further, those skilled in the art should appreciate that while the figures depict welding pad(s) on the second work piece, a welding pad may also exist on the first work piece 300. As shown, a welding pad 376 has a height d8 of about 0.75 mm and a width of about 2 mm. Like the other welding pads 346, 356, its length dimension generally follows the length of its work piece.

Figure 3E:
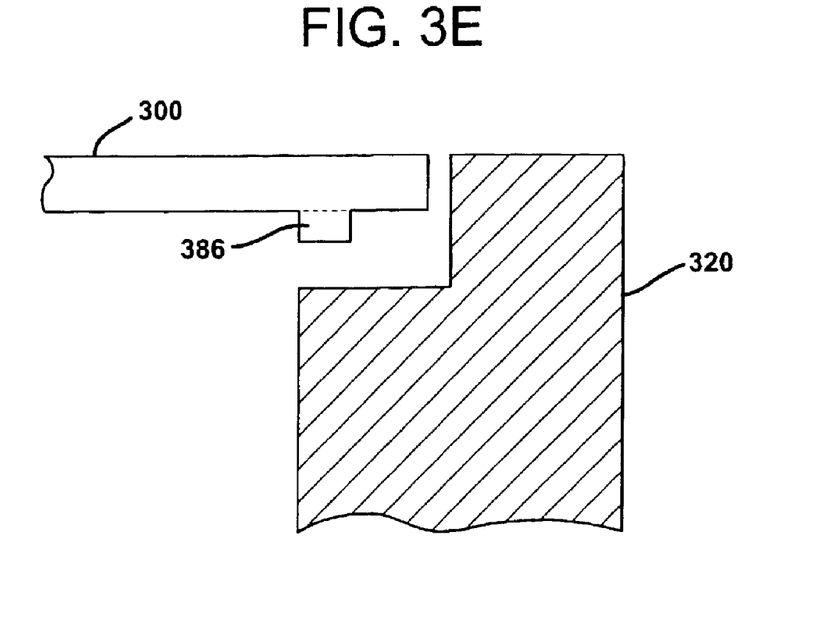
FIG. 3E is a diagrammatic view in accordance with the teachings of the present invention of an alternate embodiment of a to-be-welded welding pad.
Figure 3F:
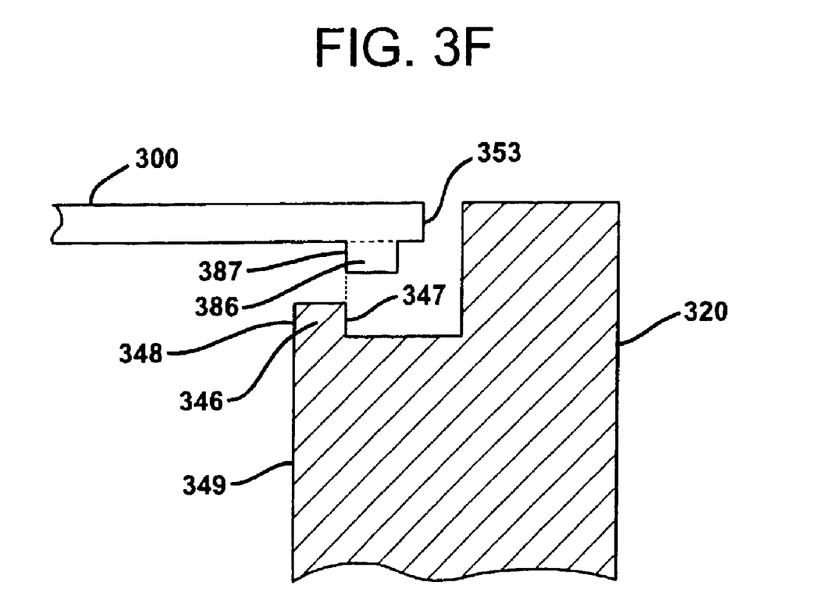
FIG. 3F is a diagrammatic view in accordance with the teachings of the present invention of an alternate embodiment of a plurality of to-be-welded welding pads.

In other embodiments, a welding pad may exist exclusively on the first work piece instead of the second work piece. FIG. 3E shows such an embodiment as a welding pad 386 extending some distance from a work piece 300. In FIG. 3F, the invention contemplates that both work pieces 300, 320 have welding pads 346, 386 and their relative positioning is such that side surfaces 387, 347 exist adjacent to one another when contacted or brought near one another before welding. It should also be noted that the welding pad 346 has a surface 348 opposite the surface 347 that exists substantially flush with a surface 349 of the second work piece. In contrast, the welding pad 387 embodies a mid-mount structure, i.e., it does not existing at or near a terminal end 353 of the work piece 300. Thus, both mid-mount and terminal end located welding pads are embraced herein.

While the invention has shown various welding pad embodiments, still further examples exist that can provide the advantage of the present invention. For example, the welding pads may embody shapes other than rectangular masses, such as ovals, circles, semicircles, polygons, curved, irregular or other. Pluralities of fractional welding pads may exist in close proximity to one another that together represent one of the welding pads shown. Still further, the welding pads may buttress the corner region 250 or exist flush with surface 349, as shown in FIG. 3F, or at any position along the surface 342 or 313.

Figure 4A:
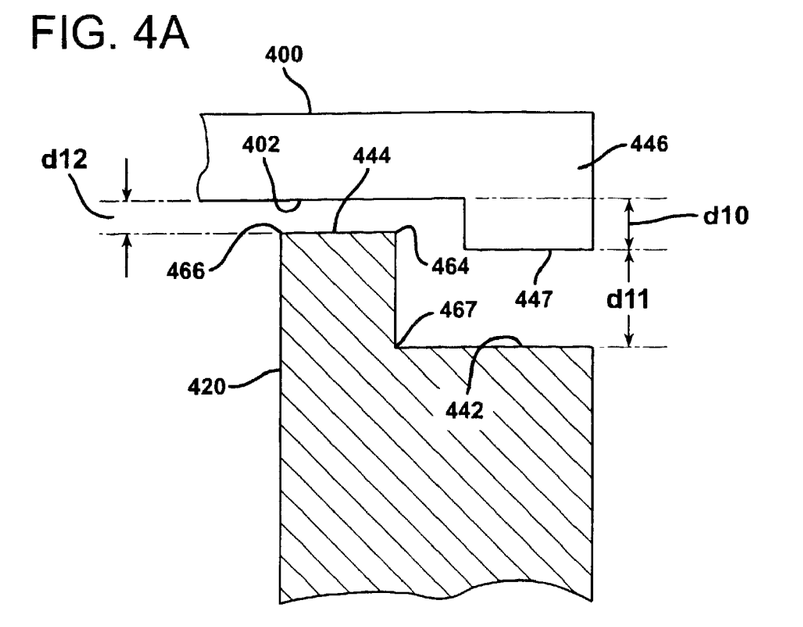
FIG. 4A is a diagrammatic view in accordance with the teachings of the present invention of a stop projection that impedes or stops collapse during a laser welding operation.
Figure 4B:
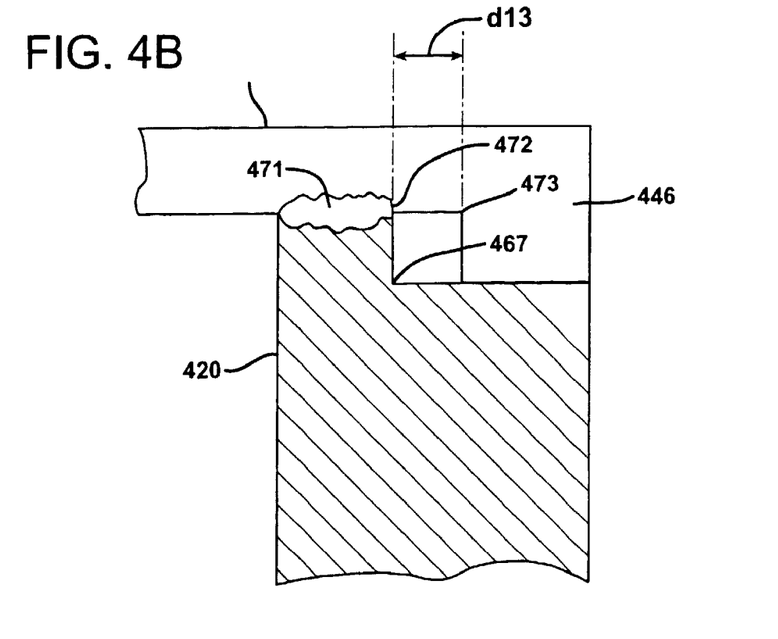
FIG. 4B is a diagrammatic view in accordance with the teachings of the present invention of the stop projection of FIG. 4A after laser welding of the work pieces.

With reference to FIGS. 4A and 4B, in another aspect of the invention, a stop projection 446 extends a distance d10 from a first work piece 400 to control a distance of collapse between two to-be-welded work pieces 400, 420. As shown, a weld interface exists when undersurface 402 of the first work piece contacts a top 444 of the second work piece between positions 466 and 464 before welding. When contacted, a terminal end 447 of the stop projection exists a distance d11 minus d12 above a surface 442 of the second work piece. During welding, a beam of laser light passes through the first work piece 400 and heats the weld interface. Then, in combination with pressure, collapses the weld interface (especially collapsing the second work piece 420, between positions 464 and 467, downward towards surface 442). The distance of collapse, however, becomes limited by the stop projection, namely the terminal end 447, impacting or contacting the surface 442 of the second work piece.

After welding, the weld interface cools and becomes a weld joint 471. In a preferred embodiment, the stop projection 446 exists a separation distance d13 from the weld interface/joint defined between a terminal end 472 of the weld interface or weld join to a position 473 where the stop projection extends from the first work piece.

Figure 4C:
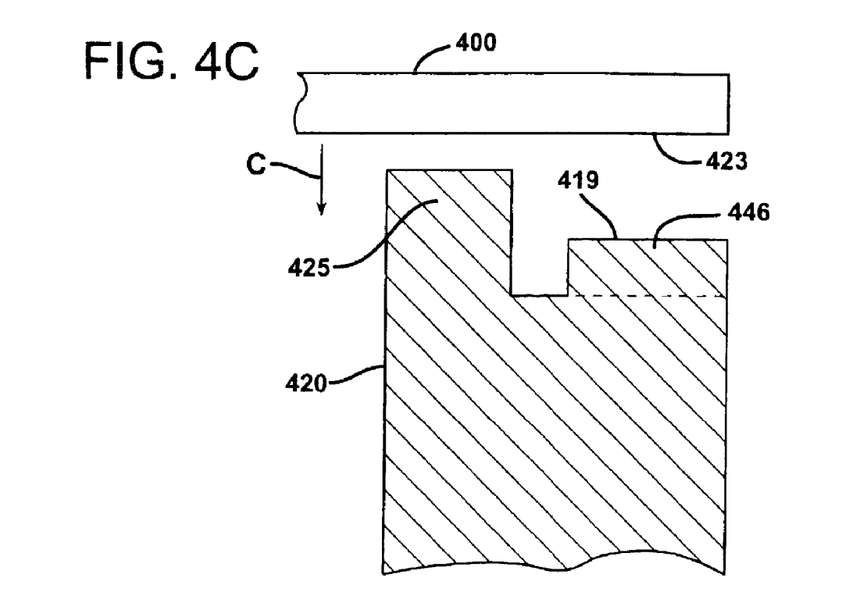
FIG. 4C is a diagrammatic view in accordance with the teachings of the present invention of an alternate embodiment of a stop projection.

With reference to FIG. 4C, those skilled in the art should appreciate that the stop projection 446 could alternatively exist exclusively on the other work piece, second work piece 420. Then, during the heat and pressure of welding, a region 425 of the second work piece collapses in the direction of arrow C until a surface 423 impacts or otherwise contacts a surface 419 of the stop projection 446. In still other embodiments, pluralities of stop projections could exist on a single work piece or singles or pluralities could exist on both work pieces at the same time.

Figure 5:
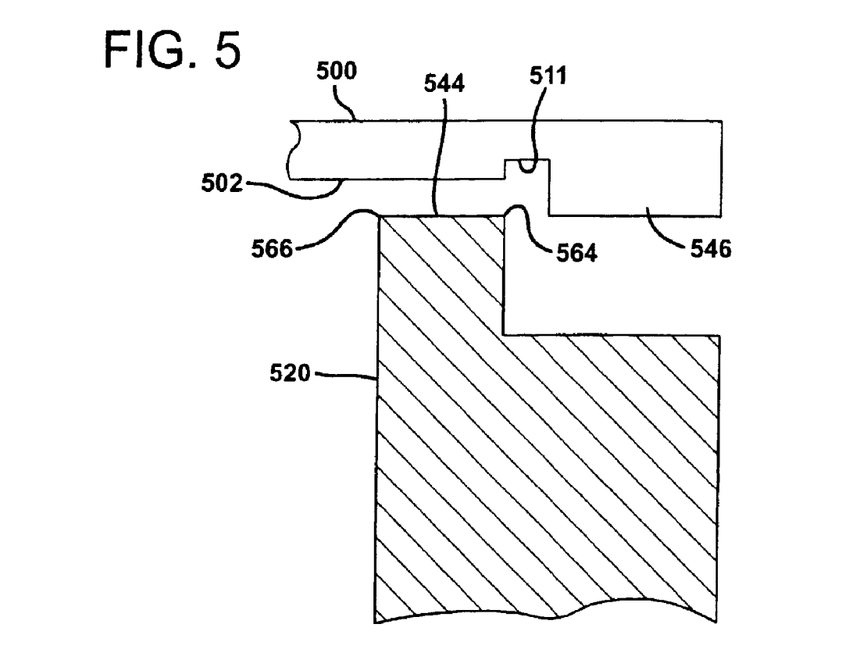
FIG. 5 is a perspective view in accordance with the teachings of the present invention of a buffer between a stop projection and a weld interface.
Figure 6:
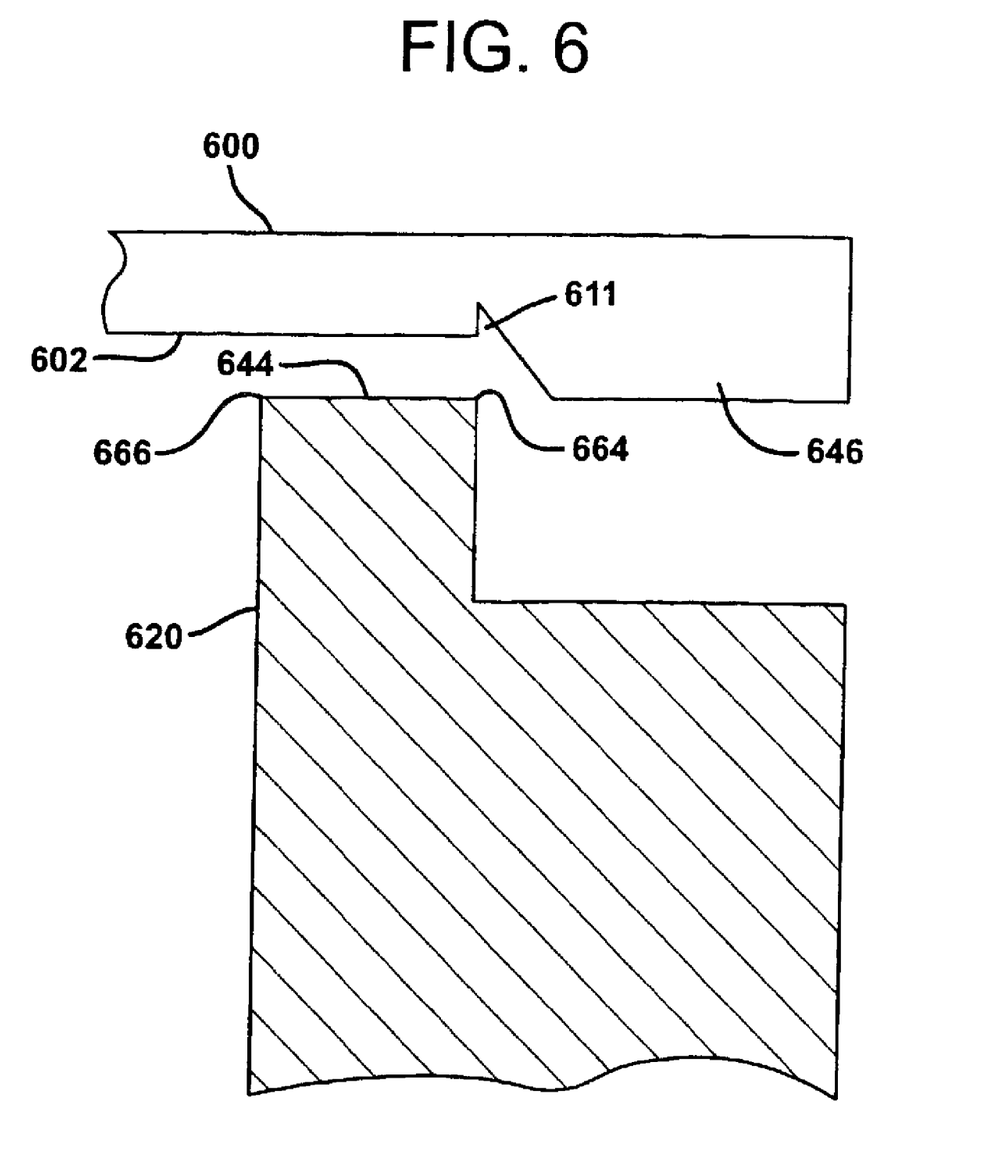
FIG. 6 is a perspective view in accordance with the teachings of the present invention of an alternate embodiment of a buffer between a stop projection and a weld interface.

In FIG. 5, a buffer 511 exists between the weld interface (where undersurface 502 of the first work piece 500 contacts a top 544 of the second work piece 520 between positions 566 and 564) and the stop projection 546. Such buffer, during welding, limits the amount of heat, thus the amount of melting, developed in the stop projection 546. In this manner, the structural integrity of the stop projection remains intact and more sturdily resists the collapse and maintains structural support for the weld joint during cooling. The buffer 511 may assume any form including a rectangular cross-section cut in work piece 500 as shown. FIG. 6 differs from FIG. 5 only in the shape of the buffer 611. Preferably, buffer 611 limits an amount of laser light that arrives at the stop projection 646 during welding, in turn, limiting heat and melting.

Like the welding pads previously described, the stop projections preferably become formed of the same composition and at the same time as the work piece on which they exist and do so under any of the well known injection molding processes. One preferred composition includes polyphenylene ether plus polystyrene.

Those skilled in the art should appreciate that the invention embraces all other shapes of buffers and even contemplates the addition of a substance between the weld interface and the stop projection, the substance preferably having non-conductive heat and/or non-transmittance of light properties.

As described herein, all embodiments have included a first work piece embodied as a laser light transparent material and a second work piece embodied as a laser light absorbing material. The transparency or opaqueness of these structures, however, does not mean that 100% laser light gets transmitted or blocked. The transparency and opacity is only required to allow enough light to transit the first work piece and get absorbed by the second work piece to form an appropriate laser weld. A preferred satisfactory rate of transmission for the first work piece includes rates above about 50%. A more preferred rate includes rates above about 80%. Those skilled in the art know that numerous parameters contribute to the rate of transmission and include, among others, laser wavelength, incident angle of the laser beam, surface roughness of the work piece, temperature of the work pieces, thickness/dimensions of the work piece, composition of the work piece and, in the instance when the work pieces comprise plastics, additives such as flame retardants, plasticizers, fillers and colorants.

Figure 7:
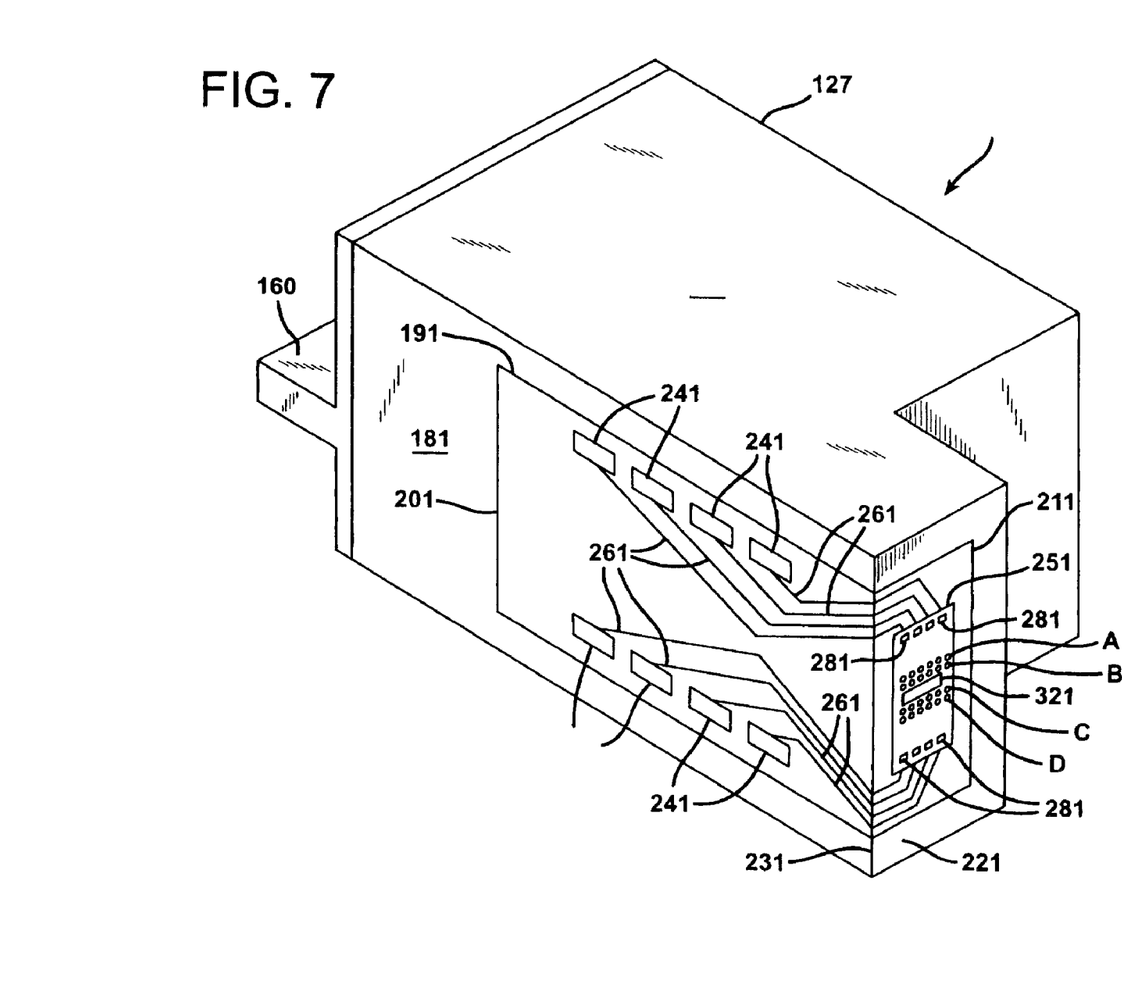
FIG. 7 is a perspective view in accordance with the teachings of the present invention of an inkjet printhead having a lid and body laser welded together.
Figure 8:
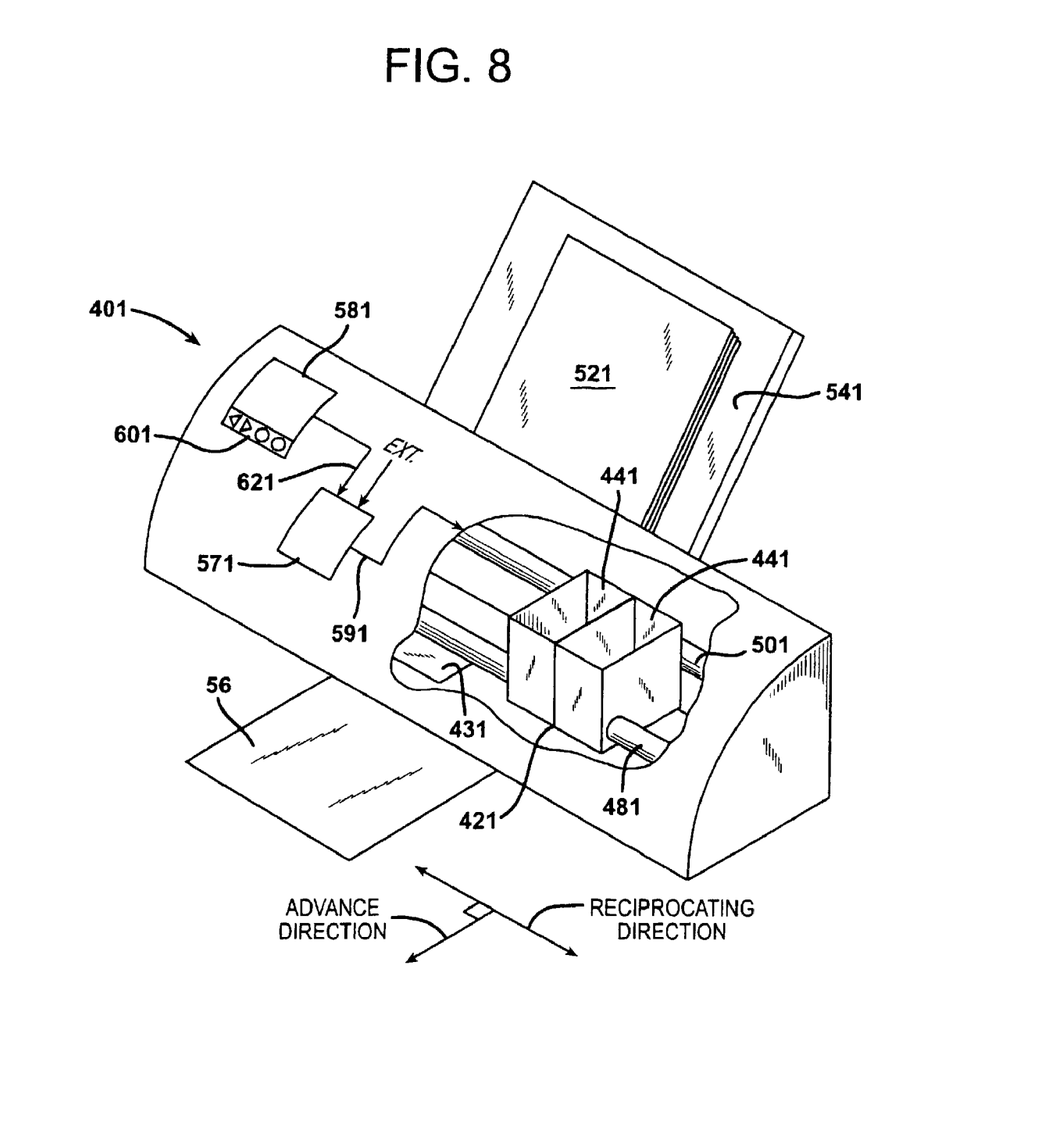
FIG. 8 is a perspective view in accordance with the teachings of the present invention of an inkjet printer for housing an inkjet printhead having a laser welded lid and body.

Since the to-be-welded work pieces of the present invention can embody inkjet printhead lids and bodies, in FIGS. 7 and 8 we describe other functional aspects of an inkjet printhead and the printer that uses them. In particular, with reference to FIG. 7, a printhead of the present invention is shown generally as 101. The printhead 101 has a housing 121 formed of a body 161 and a lid 160 laser welded together with one of a welding pad or a stop projection on one or both of the work pieces. The shape of the housing varies and depends upon the external device that carries or contains the printhead, the amount of ink to be contained in the printhead and whether the printhead contains one or more varieties of ink. In any embodiment, the housing has at least one compartment, internal thereto, for holding an initial or refillable supply of ink and a structure, such as a foam insert, lung or other, for maintaining appropriate backpressure in the inkjet printhead during use. In one embodiment, the internal compartment includes three chambers for containing three supplies of ink, especially cyan, magenta and yellow ink. In other embodiments, the compartment may contain black ink, photo-ink and/or plurals of cyan, magenta or yellow ink. It will be appreciated that fluid connections (not shown) may exist to connect the compartment(s) to a remote source of ink.

A portion 191 of a tape automated bond (TAB) circuit 201 adheres to one surface 181 of the housing while another portion 211 adheres to another surface 221. As shown, the two surfaces 181, 221 exist perpendicularly to one another about an edge 231.

The TAB circuit 201 has a plurality of input/output (I/O) connectors 241 fabricated thereon for electrically connecting a heater chip 251 to an external device, such as a printer, fax machine, copier, photo-printer, plotter, all-in-one, etc., during use. Pluralities of electrical conductors 261 exist on the TAB circuit 201 to electrically connect and short the I/O connectors 241 to the bond pads 281 of the heater chip 251 and various manufacturing techniques are known for facilitating such connections. It will be appreciated that while eight I/O connectors 241, eight electrical conductors 261 and eight bond pads 281 are shown, any number are embraced herein. It is also to be appreciated that such number of connectors, conductors and bond pads may not be equal to one another.

The heater chip 251 contains at least one ink via 321 that fluidly connects to a supply of ink internal to the housing. During printhead manufacturing, the heater chip 25 preferably attaches to the housing with any of a variety of adhesives, epoxies, etc. well known in the art. As shown, the heater chip contains four rows (rows A-row D) of heaters. For simplicity in this crowded figure, dots depict the heaters in the rows. It will be appreciated that the heaters of the heater chip preferably become formed as a series of thin film layers made via growth, deposition, masking, photolithography and/or etching or other processing steps. A nozzle plate with pluralities of nozzle holes, not shown, adheres over the heater chip such that the nozzle holes align with the heaters.

With reference to FIG. 8, an external device, in the form of an inkjet printer, for containing the printhead 101 is shown generally as 401. The printer 401 includes a carriage 421 having a plurality of slots 441 for containing one or more printheads. The carriage 421 is caused to reciprocate (via an output 591 of a controller 571) along a shaft 481 above a print zone 461 by a motive force supplied to a drive belt 501 as is well known in the art. The reciprocation of the carriage 421 is performed relative to a print medium, such as a sheet of paper 521, that is advanced in the printer 401 along a paper path from an input tray 541, through the print zone 461, to an output tray 561.

In the print zone, the carriage 421 reciprocates in the Reciprocating Direction generally perpendicularly-to the paper Advance Direction as shown by the arrows. Ink drops from the printheads are caused to be ejected from the heater chip 251 (FIG. 7) at such times pursuant to commands of a printer microprocessor or other controller 571. The timing of the ink drop emissions corresponds to a pattern of pixels of the image being printed. Often times, such patterns are generated in devices electrically connected to the controller (via Ext. input) that are external to the printer such as a computer, a scanner, a camera, a visual display unit, a personal data assistant, or other.

To print or emit a single drop of ink, the heaters (the dots of rows A–D, FIG. 7) are uniquely addressed with a small amount of current to rapidly heat a small volume of ink. This causes the ink to vaporize in a local ink chamber and be ejected through, and projected by, a nozzle plate towards the print medium.

A control panel 581 having user selection interface 601 may also provide input 621 to the controller 571 to enable additional printer capabilities and robustness.

As described herein, the term inkjet printhead may in addition to thermal technology include piezoelectric technology, or other, and may embody a side-shooter structure instead of the roof-shooter structure shown. Finally, since the to-be-welded work pieces described above may embody an inkjet printhead lid and body and since laser welding imparts essentially no vibratory motion in the work pieces, unlike ultrasonic welding, less cracking of the heater chip occurs and less air becomes entrained in the ink during printhead manufacturing.

Figure 9A:
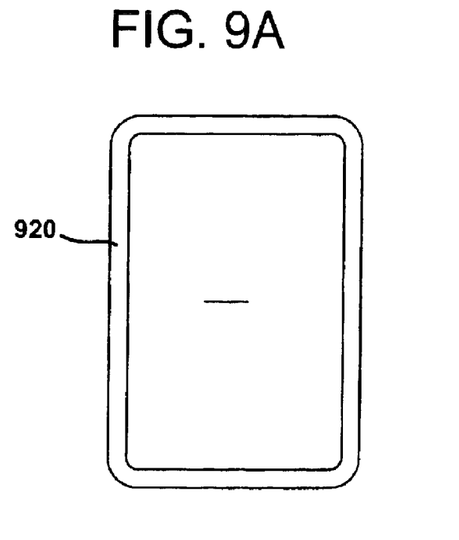
FIG. 9A is a diagrammatic top view of a surface of a mono inkjet printhead body to be laser welded.
Figure 9B:
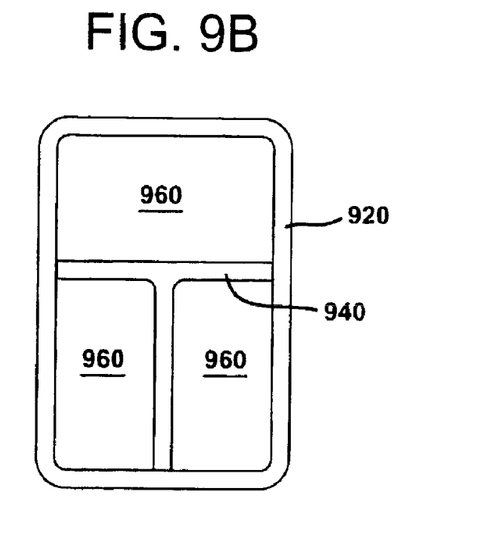
FIG. 9B is a diagrammatic top view of a surface of a color inkjet printhead body to be laser welded.

With reference to FIG. 9, since mono ink and color ink inkjet printhead bodies have different internal surfaces which causes welding to occur at different locations and since a manufacturer would suffer inconvenience if required to retool a laser welding apparatus when switching manufacturing from mono to color bodies, the invention further discloses methods of selectively controlling laser light according to whether the inkjet printhead body embodies a mono or color ink type. In FIG. 9A, the inkjet printhead body type embodies a mono ink cartridge having a perimeter 920 to-be-welded surface while in FIG. 9B it embodies a color ink cartridge having a perimeter 920 plus interior 940 to-be-welded surface. In particular, the interior has a T-shape that separates three substantially equal volume ink container sections 960 whereas the mono ink embodiment has a single container section 921.

Figure 10A:
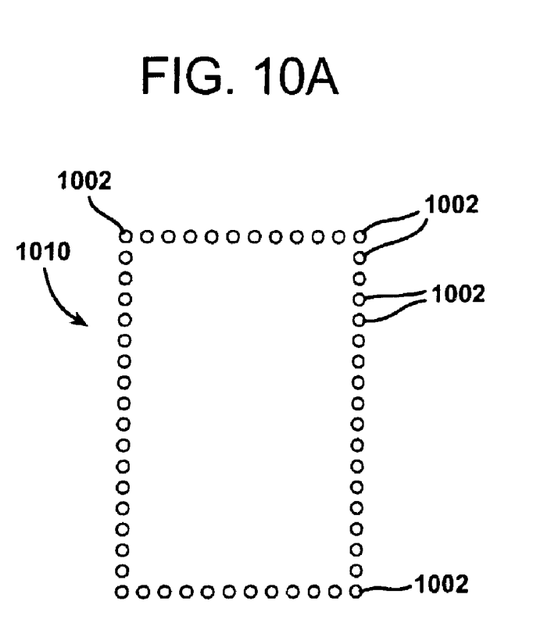
FIG. 10A is a diagrammatic view of a bank of laser beam fiber optic bundles controlled for laser welding the mono inkjet printhead body of FIG. 9A.
Figure 10B:
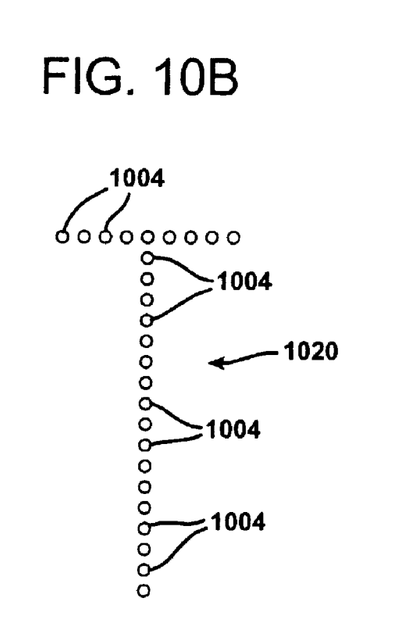
FIG. 10B is a diagrammatic view of another bank of laser beam fiber optic bundles controlled, together with the bank of laser beam fiber optic bundles of FIG. 10A, for laser welding the color inkjet printhead body of FIG. 9B.

In FIG. 10A, pluralities of laser beam fiber optic bundles 1002 will become controlled such that light will pass through the fiber optic bundles and illuminate an inkjet printhead lid to weld in a pattern, generally 1010, substantially similar to the perimeter 920 to-be-welded surface. In FIG. 10B, pluralities of laser beam fiber optic bundles 1004 will become controlled such that light will pass through the fiber optic bundles and illuminate an inkjet printhead lid to weld in a pattern, generally 1020, plus pattern 1010 together yielding a composite pattern substantially similar to the perimeter 920 plus interior 940 to-be-welded surface.

Figure 11A:
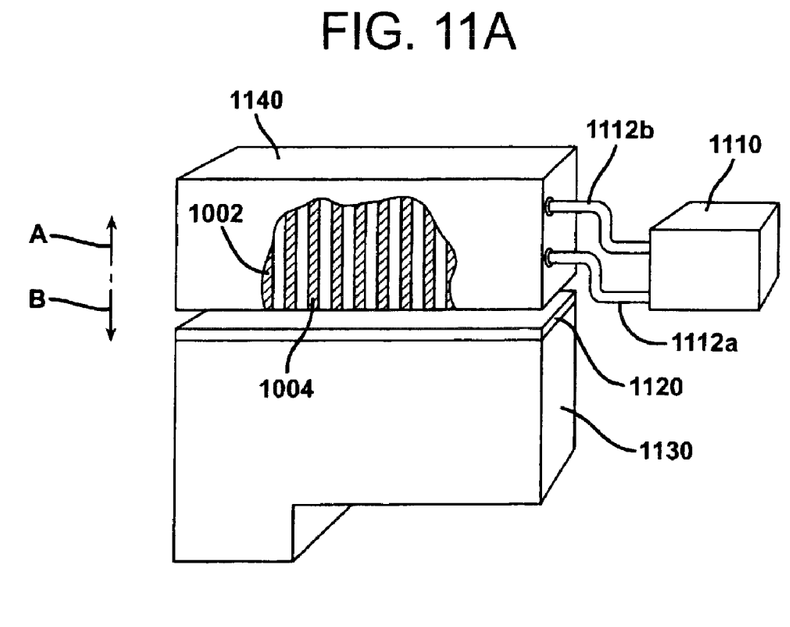
FIG. 11A is a diagrammatic view of a first embodiment of a laser welding structure for controlling the banks of laser beam fiber optic bundles of FIGS. 10A and 10B during a welding operation of an inkjet printhead lid and body.
Figure 11B:
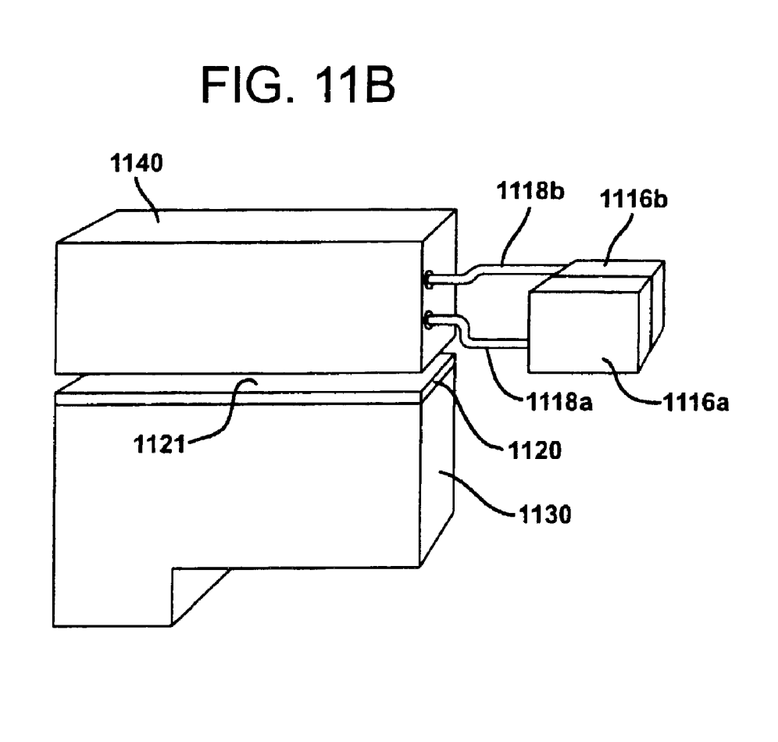
FIG. 11B is a diagrammatic view of a second embodiment of a laser welding structure for controlling the banks of laser beam fiber optic bundles of FIGS. 10A and 10B during a welding operation of an inkjet printhead lid and body.

Representative laser welding structures that can accomplish the pattern control of FIGS. 10A, 10B are shown in FIGS. 11A and 11B. Specifically, either one laser light source 1110 having two discrete lines of control 112a, 1112b, or two light sources 1116a, 1116b each having a unique control line 1118a, 1118b, become controlled such that either the laser beam fiber optic bundles 1002 or the laser beam fiber optic bundles 1002 together with the laser beam fiber optic bundles 1004 illuminate an inkjet printhead lid 1130, to weld to the lid to an inkjet printhead body 1130, in either a pattern substantially similar to the perimeter to-be-welded surface or the perimeter plus interior to-be-welded surface.

The housing 1140 that contains the pluralities of laser beam fiber optic bundles may raise (arrow A) or lower (arrow B) onto an upper surface 1121 of the inkjet printhead to release or supply a pressing engagement of the lid and body.

In one embodiment, the laser source represents an 180 nm wavelength Aluminum Gallium Arsenide (AlGaAs) semiconductor laser having a laser power of about 50 watts. Other embodiments include, but are not limited to, other types of continuous wave lasers with similar power intensity such as semiconductor lasers based on Indium Gallium Arsenide (InGaAs) with wavelengths 940–990 nm and Aluminum Gallium Indium Phosphide (AlGaInP) with wavelengths 630–680 nm, solid state lasers such as lamp pumped Neodymium-doped Yttrium Aluminum Garnet (Nd:YAG) with wavelength 1064 nm and diode pumped Neodymium-doped Yttrium Aluminum Garnet (Nd:YAG) with wavelength 1064 nm or other.

Consequently, a single laser welding structure can shuttle varieties of inkjet body types through the structure and weld each type without having to retool its basic configuration. As an example, an inkjet printhead lid welds to a mono inkjet printhead body with a perimeter to-be-welded surface by illuminating the inkjet printhead lid 1120 with pluralities of laser beam fiber optic bundles 1002 in a pattern 1010 substantially similar to the perimeter to-be-welded surface. Thereafter, the welded inkj et printhead lid gets exchanged for another inkjet printhead lid requiring welding to a color inkjet printhead body with a perimeter plus interior to-be-welded surface and becomes illuminated, through control of the laser light source(s), with pluralities of laser beam fiber optic bundles 1002 and 1004 in a composite pattern 1020 plus pattern 1010 together being substantially similar to the perimeter plus interior to-be-welded surface of FIG. 9B.

Those skilled in the art, however, should appreciate that this invention has utility beyond the patterns shown and may extend to any pattern, line, shape or other.

The foregoing description is presented for purposes of illustration and description of the various aspects of the invention. The descriptions are not intended to be exhaustive or to limit the invention to the precise form disclosed. For example, the written specification consistently used a first work piece as embodying a laser transparent work piece while the second work piece embodied a laser light absorbent work piece. In the claims, however, the first and second work pieces can be either transparent, light absorbing or having portions of both transparency or light absorbency and are only limited if specifically required to be transparent or absorbent. Still further, the embodiments described above were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method of laser welding an inkjet printhead lid and an inkjet printhead body, comprising:
   providing a welding pad on one of the inkjet printhead lid and inkjet printhead body;
   contacting the welding pad to the other of the inkjet printhead lid and inkjet printhead body to form a weld interface;
   laser welding the inkjet printhead lid and inkjet printhead body at the weld interface.

2. The method of claim 1, further including providing a second welding pad on the other of the inkjet printhead lid and inkjet printhead body.

3. The method of claim 2, further including contacting the second welding pad to the welding pad thereby forming the weld interface.

4. The method of claim 2, further including providing a third welding pad on the one of the inkjet printhead lid and inkjet printhead body.

5. The method of claim 1, further including cooling the weld interface.

6. The method of claim 5, further including obtaining a weld joint at the weld interface.

7. The method of claim 1, wherein the providing further includes integrally forming the welding pad together with the one of the inkjet printhead lid and inkjet printhead body.

8. The method of claim 1, wherein the laser welding further includes controlling a laser light source to weld a perimeter of the inkjet printhead lid.

9. The method of claim 8, further including controlling the laser light source to weld an interior of the inkjet printhead lid.

10. The method of claim 1, further including providing a stop projection on either of the inkjet printhead lid and body to control a distance of collapse during the laser welding.

11. The method of claim 10, further including impacting the stop projection during the laser welding.

12. The method of claim 1, further including forcing the inkjet printhead lid into the body in the vicinity of the welding pad to collapse the welding pad during the laser welding.

13. In a system for laser welding an inkjet printhead lid and body together along a weld interface, the inkjet printhead lid being transparent to laser light and the body being laser light absorbent and the inkjet printhead lid is welded to the body at a weld interface, the improvement comprising a welding pad that extends from one of the inkjet printhead lid and body welded to a surface of an other of the inkjet printhead lid and body, the welding pad existing at the weld interface.

14. The system of claim 13, wherein the welding pad extends from the inkjet printhead body and further including a second welding pad on the inkjet printhead lid.

15. The system of claim 14, wherein the welding pad extends about 0.4 mm.

16. The system of claim 14, wherein the second welding pad extends from the inkjet printhead lid about 0.75 mm.

17. The system of claim 14, further including a third welding pad extending from the inkjet printhead body, the third welding pad having dimensions substantially similar to the welding pad and being vertically separated.

18. The system of claim 14, wherein the inkjet printhead lid has a polyphenylene ether plus polystyrene composition.

19. The system of claim 13, wherein the welding pad is mid-mounted on the one of the inkjet printhead lid and body.

20. The system of claim 13, wherein the inkjet printhead body has a polyethylene terephthalate composition.

* * * * *